(12) United States Patent
Girshov et al.

(10) Patent No.: US 6,953,078 B2
(45) Date of Patent: Oct. 11, 2005

(54) METHOD FOR FORMING CONSUMABLE ELECTRODES FROM METALLIC CHIP SCRAPS

(76) Inventors: Vladimir Leonidovich Girshov, ul. Orbely, 29, 15, St. Petersburg (RU), 194223; Arcady Munjyvich Podpalkin, pr. Marshal Blukher 63-2, 28, St. Petersburg (RU), 195253; Arnold Nikolayevich Treschevskiy, ul. Narodnogo Opolchenija, 159, 67, St. Petersburg (RU), 198260; Alexey Alexandrovich Abramov, ul. Rudneva, 11, 203, St. Petersburg (RU), 194292

( * ) Notice: Subject to any disclaimer, the term of this patent is extended or adjusted under 35 U.S.C. 154(b) by 57 days.

(21) Appl. No.: 10/672,970

(22) Filed: Sep. 29, 2003

(65) Prior Publication Data

US 2004/0099396 A1 May 27, 2004

Related U.S. Application Data

(60) Provisional application No. 60/416,955, filed on Oct. 9, 2002.

(51) Int. Cl.⁷ .............................................. B22D 19/04
(52) U.S. Cl. ........................... 164/97; 164/98; 164/508
(58) Field of Search ........................... 164/97, 98, 508; 75/746; 419/33, 54, 55

(56) References Cited

U.S. PATENT DOCUMENTS 4,088,176 A * 5/1978 Simons ..................... 164/66.1
4,832,760 A   5/1989 Eylon et al.

FOREIGN PATENT DOCUMENTS

| RU | 2040367 | 7/1995 |
|---|---|---|
| RU | 2048268 | 11/1995 |
| RU | 2081727 | 6/1997 |
| RU | 2114925 | 7/1998 |
| RU | 2148665 | 5/2000 |
| RU | 2152447 | 7/2000 |
| RU | 2001109063 | 3/2001 |
| RU | 2001113682 | 5/2001 |
| RU | 2197548 | 1/2003 |
| RU | 2201977 | 4/2003 |

OTHER PUBLICATIONS

A.D. Hartman et al, journal JOM, Sep. 1998, pp. 16–19.
F.H. Froes, journal JOM, Sep. 1998, pp. 41–43.
Tantal advertisement bulletin, 1991, Ufa, Russian Federation.
V.L. Girshov et al, 9th World Conference on Titanium, Jun. 7–11, 1999, St. Petersburg, Russia.
Project 717 ISTC, Titanium Recycling, Final Report, pp. 3 and 6, dated Jul. 22, 2002.

* cited by examiner

Primary Examiner—Len Tran
(74) Attorney, Agent, or Firm—Richard A. Morgan; Paul A. Gottlieb

(57) ABSTRACT

The method relates to metallurgical recycling of waste products, preferably titanium alloys chips scrap.

Accordingly after crushing and cleaning, the chip scrap is subjected to vacuum-thermal degassing (VTD); the chip scrap is pressed into briquettes; the briquettes are placed into a mould allowing sufficient remaining space for the addition of molten metal alloy; the mould is pre-heated before filling with the molten metal alloy; the mould remaining space is filled with molten metal alloy. After cooling, the electrode is removed from the mould.

The method provides a means for 100% use of chip scrap in producing consumable electrodes having increased mechanical strength and reduced interstitial impurities content leading to improved secondary cast alloys.

8 Claims, No Drawings

METHOD FOR FORMING CONSUMABLE ELECTRODES FROM METALLIC CHIP SCRAPS

CROSS-REFERENCE TO RELATED APPLICATIONS

This application claims the benefit of U.S. Provisional Application No. 60/416,955 filed Oct. 9, 2002, entitled "Method for Forming Consumable Electrodes from Metallic Chip Scraps", which is incorporated herein by this reference.

STATEMENT REGARDING FEDERALLY SPONSORED RESEARCH OR DEVELOPMENT

The United States Government has rights in this invention.

REFERENCE TO A "SEQUENCE LISTING", A TABLE, OR A COMPUTER PROGRAM LISTING APPENDIX SUBMITTED ON A COMPACT DISC (SEE 37 CFR 1.52(E)(5))

Not Applicable

BACKGROUND OF THE INVENTION

1. Field of the Invention

The present invention relates to metallurgical recycling of engineering industry waste products, preferably chips, in particular, titanium alloys chips. The product of processing in the form of consumable electrodes can be used for secondary titanium alloys manufacture, as well as in ferrous metallurgy for steel alloying.

2. Description of Related Art

The most commonly known, (about 45% of the total amount of factory metallic waste products), and the most difficult to be recycled, sort of waste products is chip scrap. The difficulty of preparation of which for recycling consists in it's great volume, contamination with emulsion, machining oil contamination, as well as contamination with foreign particles of another metals and hard alloys. At present time only a minor amount of chip scrap waste products is recycled, the greater part of it presenting an environmental burden without deriving economic benefits.

One current method for producing consumable electrodes using 10–15% of chip scrap, and the rest is—titanium sponge (Kiparisov S. S. and others. *Titanium scrap processing*, M., 1984, issue 1.), is characterized in that, at first briquettes are pressed, further said briquettes are welded in argon into consumable electrode. A limitation of said method is the use of a considerable amount of expensive titanium sponge, and insufficient mechanical strength of the electrodes, which can lead to destruction thereof during refining.

Another method for obtaining consumable electrodes (Filin Yu. A. and others. *Processing and use of titanium waste products in foundries*, jorn. "Liteinoe proizvodstvo", 2000, No. 7, p.21.) from foundry titanium bulk scrap and briquetted chip scrap is characterized by packing bulk scrap and chip scrap briquettes into a mould with further filling up the mould with liquid alloy of the same name, which fills interstice between the scraps and briquettes and forms a consumable electrode. The main limitation of this method is the small portion of chip scrap waste products used, since considerable party by weight of (furnace) charge is filled up with bulk scrap, alloy and titanium sponge.

Another method for producing consumable electrodes (Abramova K. B. and others. *Briquetting of titanium chip scrap under the influence of electric current sharp pulses*, jorn. "Tsvetnye metally", 1998, No. 12, p. 70–74.) is characterized by like alloy titanium bulk scrap and chip scrap briquettes placed into a mould (the share of chip scrap in a (furnace) charge is 5–10%). The limitations of this method are as follows: low rate of chip scrap waste products used, and considerable oxygen content in the ingot obtained after remelting the electrode manufactured in accordance with said method, since owing to chip scrap contamination in case of one percent increase of number of briquettes in (furnace) charge results in oxygen content rise in secondary alloy by 0.008%.

Another method for producing consumable electrodes from titanium and alloys thereof (Patent RF No. 2081727, B22 27/00, 1997, No. 17), uses scrap, clipping and chip scrap. The method is characterized in that preliminarily preparation of (furnace) charge, its placing into a mould and filling up with molten alloy is carried out. When a (furnace) charge is used in form of chip scrap briquettes, said chip scrap briquettes are loaded into the mould with clearance, which provide mould volume infill with molten metal; and before filling up the mould is heated up to 300–350 deg C. Furthermore, depending on charging volume of the mould with (furnace) charge different methods for filling in molten metal are used. Said method has the same limitations as the previously cited methods, namely, low rate of chip scrap waste products used in metallurgical recycling and considerable interstitial impurities content such as carbon, oxygen, hydrogen and nitrogen which lead to mechanical degradation of secondary alloys, obtained after remelting the electrodes. Moreover, deficient heating of the mould before infill can result in crumbling of chip scrap during electrode refining because of weak diffusion adhesion of briquettes' material and molten alloy.

BRIEF SUMMARY OF THE INVENTION

It is an object of the invention to provide 100% utilization of chip scrap in metallurgical recycling, thereby eliminating from the consumable electrodes production method the use of expensive titanium sponge; to increase mechanical strength of the electrodes; and to improve secondary alloys due to interstitial impurities content reduction.

In the present invention, after crushing and cleaning, the chip scrap is subjected to vacuum-thermal degassing (VTD); the chip scrap is pressed into briquettes; the briquettes are placed into a mould allowing sufficient remaining space for the addition of molten metal alloy; the mould is pre-heated before filling with the molten metal alloy; the mould remaining space is filled with molten metal alloy. Finally, the mould is cooled, and the electrode is removed.

BRIEF DESCRIPTION OF THE SEVERAL VIEWS OF THE DRAWING

Not Applicable

DETAILED DESCRIPTION OF THE INVENTION

Definitions relative density—ratio of metal volume to total (metal plus pores) volume In the method of the present invention for production of consumable electrodes, chip scrap is first subjected to crushing and cleaning. This is followed by vacuum-thermal degassing (VTD) at a temperature of about 550–650 deg C. for a time of about 1–2 hours at vacuum pressure of $5 \times 10^{-3}$ mm Hg, followed by cooling to ambient. The chip scrap is pressed (cold molded) to form cylindrical shape briquettes, which are placed into a mould with sufficient clearance to allow providing infill with molten metal thereof; before filling up, the mould is heated up to 400–450 deg C. Finally, the mould is cooled, and the electrode is extracted from the mould.

Key features of this method comprise: conducting VTD of chip scrap prior its pressing to form briquettes; pre-heating the mould up to 400–450 deg C. together with briquettes loaded into said mould; and the cold molding of the briquettes to a relative density of 0.6–0.75.

Chip scrap crushing and cleaning may be performed as follows. The chip scrap, preferably titanium alloys, is crushed (by means well known in the art) to obtain particles preferably of 5–20 mm particle size. The particles are washed in degreasing solution, (for example, comprising 30–35 g/l of soda ash and 15–20 g/l of trisodium phosphate at the temperature of 60–80 deg C.); washed in water; and then dried at the temperature of 200 deg C. The dry chip scrap particles are then preferably subjected to magnetic separation (by means well known in the art).

Preferred operating parameters for the method of the present invention were determined experimentally. The prepared particles are placed in a furnace for VTD under residual pressure in furnace chamber of $5 \times 10^{-3}$ millimeters of mercury, at temperature of 550–650 deg C. and holding for 1–2 hours. The particles are cooled to 200 deg C. while maintaining the vacuum pressure in the furnace chamber, and a final cooling is executed together with furnace when vacuum pumps are cut off. During VTD, dirt is removed from the surface of chip scrap, deformation cold-hardening formed during machining of the alloy and chip scrap crushing is cut off. As a result, chip scrap pressing effort is reduced by 20–30% (at prescribed briquette density). The temperature of degassing from 550 deg C. to 650 deg C. under holding for 1–2 hours provides greatest effect of gas dirt removing and chip scrap surface microhardness (cold-hardening) lowering. Use of VTD temperature over 650 deg C. and holding for over 2 hours is not economically sound because of considerable power inputs.

The pressing (cold molding), by means well known in the art, of chip scrap particles results in briquettes preferably having relative density in the range of 0.6–0.75. As is known in art for powder metallurgy, mechanical or hydraulic presses may be used. For the pressing operation, steel pressing molds with surface hardness 45–50 HRC (without lubricants) may be used. For transportation of chips and pressed briquettes, stainless steel containers may be used. The cold molding is carried out at ambient temperature. The cold molding is performed under a steadily applied force, applied pressure generally being in the range of 300–400 MPa. In preferred embodiments, the casting clearance size is based on values of from 0.8 to 0.9 of briquettes' diameter to internal mould diameter ratio, the ratio of briquette height to its diameter being selected from the range of 0.5:3, and placing a briquette with maximum relative density on the bottom of the mould.

Mould heating up to preferred temperature in the range of 400–450 deg C. has been found to assure maximum adhesion of chip scrap briquettes' material and molten alloy fill. Molten alloy fill is then poured into the mould to taking up the remaining clearance volume. The pouring operation is performed while under vacuum. In preferred embodiments, the molten alloy fill is of the same or similar chemical composition as the chip scrap briquettes. For subsequent electrode manufacture the previous electrode is used, said electrode is melted in the amount equal to the quantity (mass) of alloy filled into the mould during the previous electrode manufacture. Said conditions are selected for providing sufficient mechanical strength of consumable electrodes and taking into account casting characteristics of alloy filled into the mould.

After filling, the mould is cooled. In preferred embodiments, inert gas is introduced into the furnace to lessen the cooling time. In more preferred embodiments, argon or helium is used, with helium providing more rapid cooling than argon, but argon (most preferred) being more economical than helium. After the mould has cooled to 100 deg C., the furnace is opened and the electrode may be extracted from the mould. Generally cooling time of 1–2 hours may be expected, although this will ultimately depend on the poured metal mass. The electrode may be remelted without any further treatment. In those cases when an electrode of a larger mass is required, smaller consumable electrodes may be welded together, by means well known in the art.

Effectiveness of VTD

For technical results demonstration, VTD of two titanium chip scrap sample parties from BT 1-0 and BT5 alloys, (similar to ASTM B348-76 Grade 1 and Grade 5,6 alloys respectively), 40 kg each was carried out. Chip scrap grade of quality corresponded to 1st and 2nd gr., II (second) chop according to GOST (National Standard) 1639-93, showing the diminution of impurity content in the chips and lessening of their hardness. The chips did not have excessive oxidation, indicated by the lack of visible oxidation tints on their surfaces. Gas impurities content such as carbon, oxygen, hydrogen and nitrogen and microhardness of chip scrap particles were determined prior and after VTD. For determination of said operation features 5 to 10 preforms from each chip scrap sample party were taken and the obtained results were averaged over. Carbon content was determined by coulometric titration according to GOST (National Standard) 9853.3-86, oxygen content—by melting the preform in an inert gas according to GOST (National Standard) 28052-89, hydrogen—by spectral-isotope method according to GOST (National Standard) 24056-81 and nitrogen—by titrating method according to GOST (National Standard) 9853.1-79. Microhardness was determined by Vickers method. The results are given in Table 1.

TABLE 1

| Alloy grade | VTD temperature, deg C. | Carbon weight, % | Oxygen weight, % | Nitrogen weight, % | Hydrogen weight, % | Microhardness, kg/mm² |
|---|---|---|---|---|---|---|
| BT1-0 | — | 0.15 | 0.2 | 0.03 | 0.005 | 310 |
| BT1-0 | 550 | 0.028 | 0.12 | 0.022 | 0.0019 | 270 |
| BT1-0 | 600 | 0.025 | 0.14 | 0.02 | 0.0016 | 280 |
| BT1-0 | 650 | 0.029 | 0.15 | 0.02 | 0.0017 | 270 |
| BT1-0 | 700 | 0.03 | 0.13 | 0.018 | 0.0015 | 260 |
| BT5 | — | 0.08 | 0.15 | 0.02 | 0.003 | 350 |
| BT5 | 500 | 0.025 | 0.12 | 0.015 | 0.0025 | 320 |
| BT5 | 550 | 0.02 | 0.11 | 0.011 | 0.0078 | 300 |

TABLE 1-continued

| Alloy grade | VTD temperature, deg C. | Carbon weight, % | Oxygen weight, % | Nitrogen weight, % | Hydrogen weight, % | Microhardness, kg/mm² |
|---|---|---|---|---|---|---|
| BT5 | 600 | 0.018 | 0.11 | 0.014 | 0.0015 | 310 |
| BT5 | 650 | 0.015 | 0.1 | 0.012 | 0.0014 | 290 |
| BT5 | 700 | 0.012 | 0.08 | 0.01 | 0.0013 | 280 |

The analysis of the obtained results (Table 1) shows, that VTD allows to reduce gas impurities content on average for carbon by 80%, for oxygen and nitrogen by 30% and for hydrogen by 60%, and microhardness of chip scrap particles on average by 10–15%. After VTD cold molding of chip scrap briquettes on press with an effort of 1.6 MH with unidirectional circuit of application of pressing effort is carried out.

EXAMPLE

Titanium alloy chip scraps were crushed (particle size of 5–20 mm), cleaned, subjected to VTD (exposure time of one hour, at temperature of approximately 600 deg C.), and pressed into briquettes (pressure of approximately 350 MPa) per the method of the present invention. Briquettes having the diameter of 100 mm were made, said briquettes were placed into metallic retractable ingot mould with internal diameter of 120 mm and filled up with like alloy in vacuum-arc skull furnace. The heating of the mould up to 400–450 deg C. was carried out directly in the furnace, and as like alloy for manufacture of primary electrode foundry waste in the amount of no more than 50% of the manufactured primary electrode weight was used.

After pouring primary consumable electrode having diameter of 120 mm, height of 300 mm and weight of about 12 kg was obtained. The volume infill of the electrode with chip scrap briquettes came to 70%, by weight 61% (when relative density of briquettes of 0.7). For obtaining second electrode the primary one was used, said electrode was melted by weight of about 40%, the rest part of it was used for next electrode manufacture.

Altogether using the original sample parties of titanium chip scrap three electrodes were obtained from each party, said electrodes were weld in inert atmosphere and remelted using vacuum-arc fusion method in order to obtain ingots.

Chemical composition and stress-strain properties of the obtained ingots are given in Table 2.

TABLE 2

| Ingot from alloy % | Al, % | Fe, % | Si, % | C, % | O, % | N, % | H, % | Tensile Strength, (mega Paschal) MPa | Tensile strain, % | Specific Sharpy U-Notched Impact Energy kJ/m² |
|---|---|---|---|---|---|---|---|---|---|---|
| BT1-0 | — | 0.4 | 0.25 | 0.08 | 0.25 | 0.05 | 0.01 | 800 | 10 | 300 |
| BT 5 | 4.5 | 0.5 | 0.3 | 0.1 | 0.25 | 0.08 | 0.01 | 950 | 8 | 350 |

The obtained consumable electrodes with 100% use of chip scrap and secondary titanium alloys manufactured from them using skull fusing method illustrate availability of further development of the method claimed for solving the problem of materials recovery. In spite of the fact that secondary alloys have an excessive to a certain extent interstitial impurities content in comparison with regular alloys, according to their physical and mechanical figures and economic indicators they can be extensively used in different branches of engineering.

What is claimed is:

1. A method for forming a consumable electrode from metal chip scraps, the steps comprising:
    crushing said metal chip scraps into particles;
    cleaning said particles;
    vacuum-thermal degassing said particles at a temperature in the range of 550 to 650 deg C. and vacuum pressure of about $5 \times 10^{-3}$ mm of mercury for a time in the range of 1 to 2 hours, and maintaining said vacuum pressure-while said particles cool to about 200 deg C., and then cooling said particles to about ambient temperature;
    cold pressing said particles into briquettes;
    placing said briquettes into a mould, said mould having sufficient remaining space to receive the addition of molten metal alloy;
    pre-heating said mould with briquettes therein, prior to addition of molten metal alloy, to a temperature sufficient to assure adhesion of said briquettes to said molten metal alloy;
    filling said remaining space with said molten metal alloy;
    cooling said mould and consumable electrode formed therein to ambient temperature.

2. The method in accordance with claim 1, wherein said particles have sizes in the range of 5–20 mm.

3. The method in accordance with claim 1, wherein said cleaning step comprises degreasing said chip scraps; washing and drying said degreased chip scraps; subjecting said dry chip scraps to magnetic separation.

4. The method in accordance with claim 1, wherein the relative density of said briquettes is in the range of 0.6–0.75.

5. The method in accordance with claim 1, wherein said pre-heating is at a temperature in the range of 400–450 deg C.

6. The method in accordance with claim 1, further comprising cooling the mould with inert gas after said filling step.

7. The method in accordance with claim 6, wherein said inert gas is chosen from the group consisting of helium and argon.

8. The method in accordance with claim 1, wherein said metal is titanium.

* * * * *